United States Patent
Yamamoto et al.

(10) Patent No.: US 9,802,179 B2
(45) Date of Patent: Oct. 31, 2017

(54) METHOD FOR PROCESSING AN EDGE OF CATALYST-SUPPORTING HONEYCOMB STRUCTURE IN EXHAUST GAS DENITRATION APPARATUS

(71) Applicant: Hitachi Zosen Corporation, Osaka-shi (JP)

(72) Inventors: Seigo Yamamoto, Osaka (JP); Susumu Hikazudani, Osaka (JP); Naoe Hino, Osaka (JP); Kana Shimizu, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 228 days.

(21) Appl. No.: 14/380,576

(22) PCT Filed: Dec. 17, 2012

(86) PCT No.: PCT/JP2012/082619
§ 371 (c)(1),
(2) Date: Aug. 22, 2014

(87) PCT Pub. No.: WO2013/125137
PCT Pub. Date: Aug. 29, 2013

(65) Prior Publication Data
US 2015/0011379 A1  Jan. 8, 2015

(30) Foreign Application Priority Data
Feb. 22, 2012  (JP) .................................. 2012-036158

(51) Int. Cl.
*B01D 53/94* (2006.01)
*B01J 21/00* (2006.01)
(Continued)

(52) U.S. Cl.
CPC .......... *B01J 21/16* (2013.01); *B01D 53/8628* (2013.01); *B01J 23/30* (2013.01); *B01J 27/24* (2013.01);
(Continued)

(58) Field of Classification Search
CPC ... B01J 21/16; B01J 21/00; B01J 21/06; B01J 35/04; B01D 53/94
See application file for complete search history.

(56) References Cited

U.S. PATENT DOCUMENTS

| | | | |
|---|---|---|---|
| 4,559,193 | A | 12/1985 | Ogawa et al. |
| 5,124,303 | A | 6/1992 | Kobayashi et al. |

(Continued)

FOREIGN PATENT DOCUMENTS

| | | |
|---|---|---|
| CN | 101474581 A | 7/2009 |
| CN | 102015098 A | 4/2011 |

(Continued)

OTHER PUBLICATIONS

Supplementary European Search Report dated Oct. 7, 2015, issued for European patent application No. 12869182.1.
(Continued)

*Primary Examiner* — Aileen B Felton
(74) *Attorney, Agent, or Firm* — Locke Lord LLP

(57) ABSTRACT

A method for processing an edge of a catalyst-supporting honeycomb structure in an exhaust gas denitration apparatus, in which an exhaust gas denitration apparatus equipped with a denitration catalyst-supporting honeycomb structure in which a corrugated plate-like inorganic fiber sheet and a flat plate-like inorganic fiber sheet, each supporting thereon a denitration catalyst containing a silica sol, titania particles, and ammonium metavanadate as a whole primary denitration catalyst layer, are alternately laminated, the edge of gas inlet side of the denitration catalyst-supporting honeycomb (Continued)

structure having the whole primary denitration catalyst layer is dipped in a denitration catalyst-containing slurry for edge processing composed of a silica sol, titania particles or kaolin particles, and ammonium metatungstate to form a coating layer of the denitration catalyst-containing slurry in the edge of the honeycomb structure, and this is dried and then calcinated to form an edge secondary denitration catalyst layer.

5 Claims, 2 Drawing Sheets

(51) Int. Cl.
| | | |
|---|---|---|
| *B01J 21/06* | (2006.01) | |
| *B01J 21/16* | (2006.01) | |
| *B01J 23/30* | (2006.01) | |
| *B01J 35/04* | (2006.01) | |
| *B01D 53/86* | (2006.01) | |
| *B01J 35/00* | (2006.01) | |
| *B01J 37/02* | (2006.01) | |
| *B01J 27/24* | (2006.01) | |

(52) U.S. Cl.
CPC ........... *B01J 35/0006* (2013.01); *B01J 35/04* (2013.01); *B01J 37/0215* (2013.01); *B01D 2255/20707* (2013.01); *B01D 2255/20723* (2013.01); *B01D 2255/20776* (2013.01); *B01D 2255/9022* (2013.01); *B01D 2257/404* (2013.01)

(56) References Cited

U.S. PATENT DOCUMENTS

| 2005/0255021 A1* | 11/2005 | DiFrancesco ...... B01D 53/8631 423/239.1 |
|---|---|---|
| 2010/0041547 A1 | 2/2010 | Hikazudani et al. |
| 2011/0028309 A1 | 2/2011 | Hikazudani et al. |

FOREIGN PATENT DOCUMENTS

| EP | 1063003 A2 | 12/2000 |
|---|---|---|
| JP | 03-038256 A | 2/1991 |
| JP | 05-131577 A | 5/1993 |
| JP | 05-177144 A | 7/1993 |
| JP | 11-033402 A | 2/1999 |
| JP | 2001-070804 A | 3/2001 |
| JP | 2001-104801 A | 4/2001 |
| JP | 2001-170491 A | 6/2001 |
| JP | 2008-073621 A | 4/2008 |
| JP | 2008-155132 A | 7/2008 |
| JP | 2008-155133 A | 7/2008 |
| JP | 2008-296100 A | 12/2008 |

OTHER PUBLICATIONS

Official Letter dated Sep. 29, 2015, issued for Chinese patent application No. 201280070120.8.
International Search Report dated Feb. 12, 2013, issued for PCT/JP2012/082619.

* cited by examiner

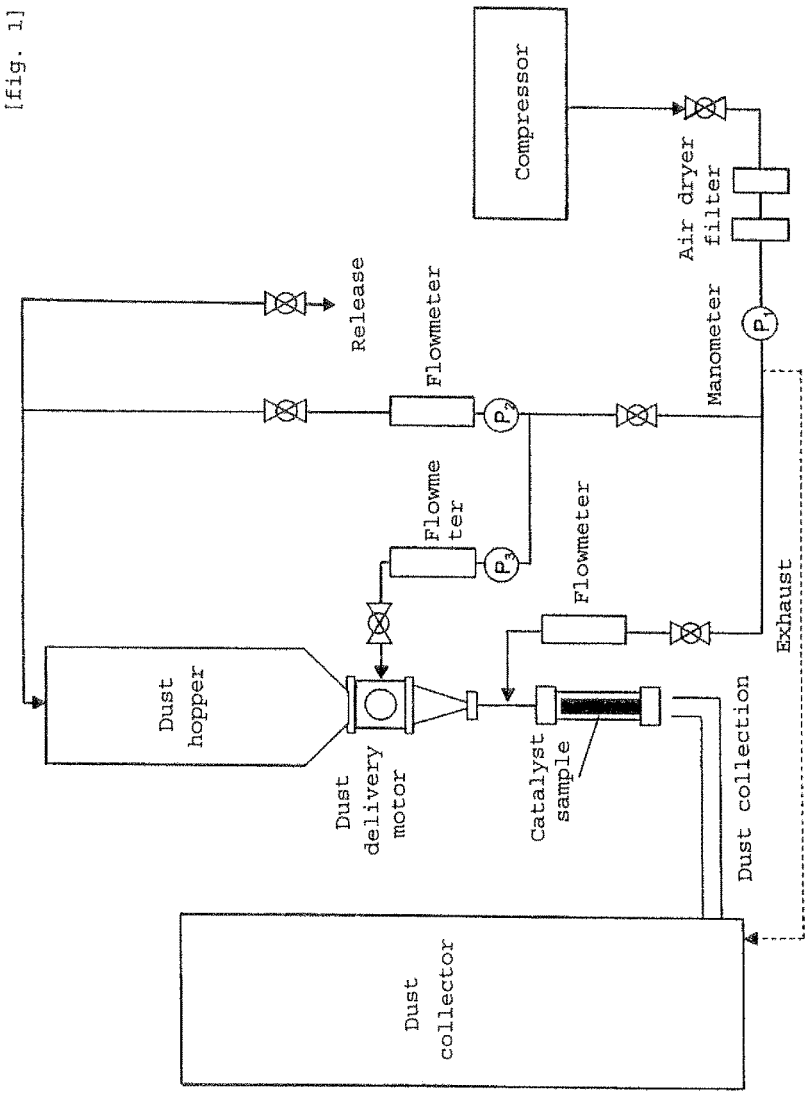
[fig. 1]

[fig. 2]
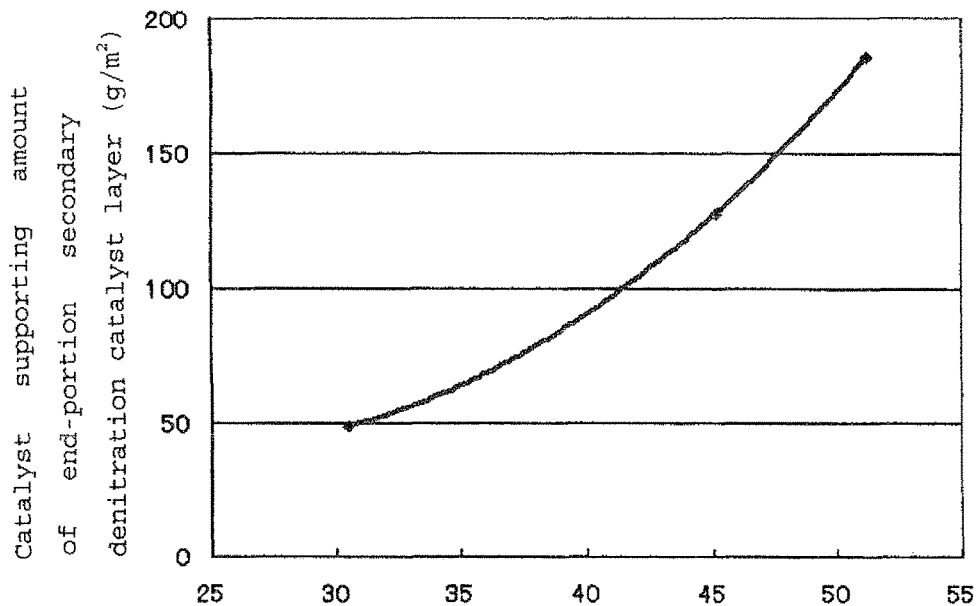
Catalyst component concentration of denitration catalyst-containing slurry for end portion processing (% by weight)
[fig. 3]
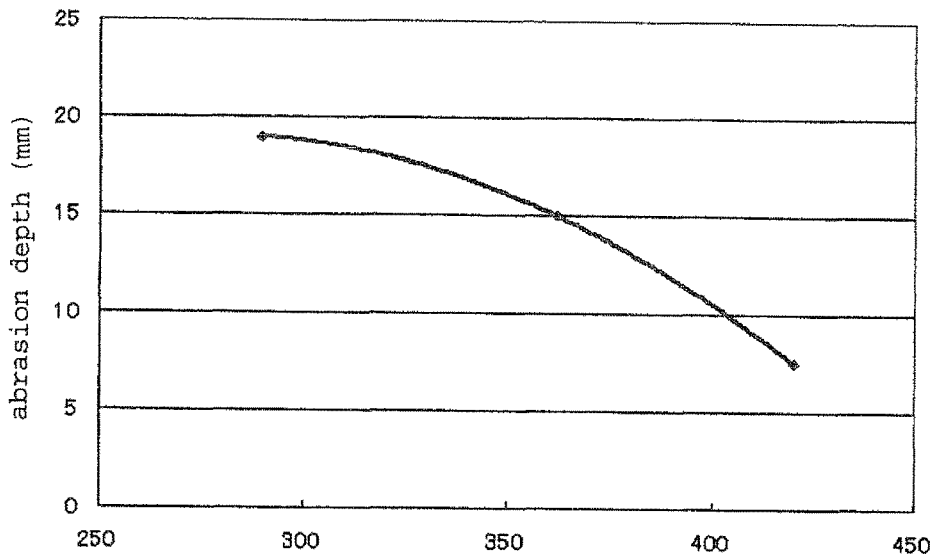
total catalyst supporting amount of end portion of honeycomb structure (g/m$^2$)

METHOD FOR PROCESSING AN EDGE OF CATALYST-SUPPORTING HONEYCOMB STRUCTURE IN EXHAUST GAS DENITRATION APPARATUS

TECHNICAL FIELD

The present invention relates to a method for processing (an) edge(s) of a catalyst-supporting honeycomb structure in an exhaust gas denitration apparatus for conducting denitration processing of an exhaust gas from, for example, a coal burning boiler containing solid particles such as high-concentration of dusts, coal ashes, etc.

BACKGROUND ART

Conventionally, as a method for manufacturing a honeycombed denitration catalyst using a ceramic fiber sheet, the following Patent Literature 1 by the present applicant discloses a method for manufacturing a denitration catalyst composed of, as a substrate, a honeycomb structure in which a corrugated plate-like ceramic fiber sheet and a flat plate-like ceramic fiber sheet are alternately laminated, which is characterized by dipping the above-described honeycomb structure in a slurry in which titania fine particles are suspended in a silica sol, drying and calcinating the resultant to hold titania and silica simultaneously on the honeycomb structure, further dipping the resulting honeycomb structure in ammonium metavanadate and ammonium metatungstate aqueous solutions in order, thereby supporting vanadium and tungsten on titania.

In addition, as a method for manufacturing a denitration catalyst in which the productivity is more enhanced, and a reduction of cost is achieved, Patent Literature 2 by the present applicant discloses a method for manufacturing a denitration catalyst composed of, as a substrate, a honeycomb structure in which a corrugated plate-like ceramic fiber sheet and a flat plate-like ceramic fiber sheet are alternately laminated, which is characterized by adding ammonium metavanadate and/or ammonium metatungstate to a slurry in which titania fine particles are suspended in a silica sol to adsorb it on titania, subsequently dipping the above-described honeycomb structure in this slurry, and drying and calcinating the resultant to support titania and vanadium and/or tungsten simultaneously on the honeycomb structure.

Furthermore, Patent Literature 3 by the present applicant discloses a slurry for manufacturing a denitration catalyst containing a silica sol, titania particles, and ammonium metavanadate and/or ammonium metatungstate, which is characterized in that its pH is adjusted with an ammonia aqueous solution to from 3.5 to 6.0.

As a method for enhancing abrasion resistant strength of an edge of the honeycombed denitration catalyst described in such Patent Literature 2 or 3, the following Patent Literature 4 by the present applicant discloses a method for hardening treatment of a catalyst edge, which is characterized in that in forming a coating layer of a ceramic having a higher hardness than the catalyst on a surface of an edge of the side in which the gas flow of the honeycombed catalyst, the edge of the catalyst is dipped in an immersion slurry for forming a coating and dried to form a coating layer, and subsequently, the coating portion is dipped in a metal salt aqueous solution, dried and then calcinated.

In addition, in the case where the supporting amount of the catalyst component is low, and hardening of the end surface is insufficient in the method of the above-described Patent Literature 4, the following Patent Literature 5 by the present applicant discloses, as a method for effectively enhancing the abrasion resistant strength of the end surface, a method for manufacturing a catalyst, which is characterized by conducting (i) a step of dipping an end surface portion of a support structure having a catalyst component supported thereon in a metal salt aqueous solution in a concentration from 2.7 to 3.88 moles/L in terms of mole of the metal; (ii) a step of drying; (iii) a step of again dipping in a metal salt aqueous solution of the same metal species as that described above in a concentration from 2.7 to 3.88 moles/L in terms of mole of the metal; and (iv) a step of conducting a calcination treatment to harden the catalyst end surface in order. In the method described in this Patent Literature 5, a solid content is dispersed in an ionic or molecular state in the metal salt aqueous solution and intrudes into and is deposited on fine cracks on a surface of the catalyst layer which will become a cause of abrasion by dust particles, thereby increasing the abrasion resistant strength due to a binder effect.

PRIOR ART LITERATURE

Patent Literature

PTL 1: JP-A-2008-155132
PTL 2: JP-A-2008-155133
PTL 3: JP-A-2008-296100
PTL 4: JP-A-2001-170491
PTL 5: JP-A-2008-073621

SUMMARY OF INVENTION

Technical Problem

However, in the denitration catalysts manufactured by the methods of the above-described Patent Literatures 2 and 3, there may be the case where the supporting amount of the catalyst component is insufficient as compared with that manufactured by the method of Patent Literature 1, and there was involved such a problem that the abrasion resistant strength of the edge is low.

In particular, in the case where the catalyst supporting amount is not more than 300 $g/m^2$, even if, according to the method described in the above-described Patent Literature 5, the edge is processed by twice dipping the edge of a gas inlet side of the support structure having a catalyst component supported thereon in the metal salt aqueous solution or increasing the concentration of the metal salt aqueous solution, because of a low viscosity of the metal salt aqueous solution, the edge could not be processed for sufficiently compensating a shortage of the abrasion resistant strength of the edge of the catalyst-supporting honeycomb structure. That is, conventionally, the enhance of the abrasion resistant strength by the catalyst supporting amount was not considered, and in particular, in the case where the catalyst supporting amount of an exhaust gas denitration apparatus is insufficient, there was no means which is effective for increasing the abrasion resistant strength of an edge of the exhaust gas denitration apparatus.

An object of the present invention is to solve the above-described problems of the conventional art and to provide a method for processing (an) edge(s) of a catalyst-supporting honeycomb structure in an exhaust gas denitration apparatus, the method being capable of filling fine cracks on a surface of the catalyst layer which will become a cause of abrasion of an edge of the catalyst-supporting honeycomb structure by solid particles such as dust particles, coal ashes, etc. in an exhaust gas and sufficiently compensating abrasion resistant strength of the edge of the honeycomb structure.

Solution to Problem

In view of the foregoing, the present inventors made extensive and intensive investigations. As a result, we thought that abrasion by solid particles such as dust particles, coal ashes, etc. in an exhaust gas is mainly seen in an edge of the gas inlet side of a denitration catalyst-supporting honeycomb structure of an exhaust gas denitration apparatus, whereas in an inner portion through which gas flows of the honeycomb structure, since the gas is rectified, and the dust particles move substantially parallel to the wall surface of the honeycomb structure, a remarkable wear or tear phenomenon is not seen, and therefore, it is more effective to increase the catalyst supporting amount in the edge of the gas inlet side of the honeycomb structure.

Then, it has been found that by dipping the edge of the gas inlet side of the honeycomb structure which is easily abraded by the dust particles in a denitration catalyst-containing slurry for edge processing composed of a silica sol, titania particles or kaolin particles, and ammonium metatungstate to form a coating layer of the denitration catalyst-containing slurry in the edge of the honeycomb structure, drying this, and then calcinating to form an edge secondary denitration catalyst layer, fine cracks on a surface of the catalyst layer which will become a cause of abrasion of the edge of the catalyst-supporting honeycomb structure can be filled, and the abrasion resistant strength of the edge of the honeycomb structure can be sufficiently compensated, leading to accomplishment of the present invention.

In order to achieve the above-described object, an invention as set forth in claim 1 is concerned with a method for processing (an) edge(s) of a catalyst-supporting honeycomb structure in an exhaust gas denitration apparatus, which is characterized in that in an exhaust gas denitration apparatus equipped with a denitration catalyst-supporting honeycomb structure in which a corrugated plate-like inorganic fiber sheet and a flat plate-like inorganic fiber sheet, each supporting thereon a denitration catalyst containing a silica sol, titania particles, and ammonium metavanadate as a whole primary denitration catalyst layer, are alternately laminated, at least the edge of gas inlet side among the gas inlet side and the gas outlet side of the denitration catalyst-supporting honeycomb structure having the whole primary denitration catalyst layer is(are) dipped in a denitration catalyst-containing slurry for edge processing composed of a silica sol, titania particles or kaolin particles, and ammonium metatungstate to form (a) coating layer(s) of the denitration catalyst-containing slurry in the edge(s) of the honeycomb structure, and this(these) is(are) dried and then calcinated to form (an) edge secondary denitration catalyst layer(s).

An invention as set forth in claim 2 is concerned with the method for processing (an) edge(s) of a catalyst-supporting honeycomb structure in an exhaust gas denitration apparatus according to claim 1, which is characterized in that ammonium metatungstate is further contained in the denitration catalyst of the whole primary denitration catalyst layer.

An invention as set forth in claim 3 is concerned with the method for processing (an) edge(s) of a catalyst-supporting honeycomb structure in an exhaust gas denitration apparatus according to claim 1 or 2, which is characterized in that a catalyst supporting amount of the whole primary denitration catalyst layer of the denitration catalyst-supporting honeycomb structure is from 100 to 300 g/m$^2$, (a) catalyst supporting amount(s) of the edge secondary denitration catalyst layer(s) is(are) from 100 to 300 g/m$^2$, and (a) catalyst supporting amount(s) in at least the edge of gas inlet side of the denitration catalyst-supporting honeycomb structure is(are) from 400 to 500 g/m$^2$ in total.

An invention as set forth in claim 4 is concerned with the method for processing (an) edge(s) of a catalyst-supporting honeycomb structure in an exhaust gas denitration apparatus according to any one of claims 1 to 3, which is characterized in that the denitration catalyst-containing slurry for edge processing has a catalyst component concentration of 50% by weight or more and not more than 60% by weight.

An invention as set forth in claim 5 is concerned with the method for processing (an) edge(s) of a catalyst-supporting honeycomb structure in an exhaust gas denitration apparatus according to any one of claims 1 to 4, which is characterized in that a range of dipping the edge of the denitration catalyst-supporting honeycomb structure having the whole primary denitration catalyst layer in the denitration catalyst-containing slurry for edge processing is 10 mm or more and not more than 50 mm from a tip of the honeycomb structure.

Advantageous Effects of Invention

According to the invention of the method for processing (an) edge(s) of a catalyst-supporting honeycomb structure in an exhaust gas denitration apparatus as set forth in claim 1, there are brought such effects that fine cracks on a surface of the catalyst layer which will become a cause of abrasion of the edge of the catalyst-supporting honeycomb structure by solid particles such as dust particles in an exhaust gas, etc. can be filled, and the abrasion resistant strength of the edge of the honeycomb structure can be sufficiently compensated.

It is preferable that ammonium metatungstate is further contained in the denitration catalyst of the whole primary denitration catalyst layer.

According to the invention of the method for processing (an) edge(s) of a catalyst-supporting honeycomb structure in an exhaust gas denitration apparatus as set forth in claim 3, there is brought such an effect that by making the catalyst supporting amount in at least the edge of gas inlet side of the denitration catalyst-supporting honeycomb structure to specifically from 400 to 500 g/m$^2$ in total, the abrasion resistant strength of the edge(s) of the honeycomb structure can be sufficiently compensated.

According to the invention of the method for processing (an) edge(s) of a catalyst-supporting honeycomb structure in an exhaust gas denitration apparatus as set forth in claim 4, there are brought such effects that the catalyst supporting amount in at least the edge of gas inlet side of the denitration catalyst-supporting honeycomb structure can be made to from 400 to 500 g/m$^2$ in total, the abrasion resistant strength of the edge(s) of the honeycomb structure can be sufficiently compensated, and the catalyst supporting amount of the edge(s) of the honeycomb structure can be calculated from the catalyst component concentration without having to measure the catalyst supporting amount of the edge(s) of the honeycomb structure minutely.

According to the invention of the method for processing (an) edge(s) of a catalyst-supporting honeycomb structure in an exhaust gas denitration apparatus as set forth in claim 5, there is brought such an effect that by making the range of dipping the edge(s) of the denitration catalyst-supporting honeycomb structure having the whole primary denitration catalyst layer in the denitration catalyst-containing slurry for edge processing to 10 mm or more and not more than 50 mm from the tip of the honeycomb structure, the denitration catalyst-supporting honeycomb structure can be sufficiently protected from abrasion by an exhaust gas from, for example, a coal burning boiler containing solid particles such as high-concentration of dusts, coal ashes, etc.

BRIEF DESCRIPTION OF DRAWINGS

FIG. 1 shows a flow diagram of an abrasion resistant strength measuring test system in the Examples of a method for processing (an) edge(s) of a catalyst-supporting honeycomb structure in an exhaust gas denitration apparatus according to the present invention.

FIG. 2 is a graph showing a relation of a catalyst component concentration (% by weight) of a denitration catalyst-containing slurry for edge processing with a catalyst supporting amount of an edge secondary denitration catalyst layer of an edge of the gas inlet side of a denitration catalyst-supporting honeycomb structure after edge processing in the Referential Examples according to the present invention.

FIG. 3 is a graph showing a relation of a total catalyst supporting amount of an edge of the gas inlet side of a denitration catalyst-supporting honeycomb structure with an abrasion depth of the subject edge after abrasion resistant strength measuring test in the Referential Examples according to the present invention.

DESCRIPTION OF EMBODIMENTS

Next, embodiments of the present invention are described, but it should not be construed that the present invention is limited thereto.

In the present invention, the exhaust gas denitration apparatus is equipped with a denitration catalyst-supporting honeycomb structure in which a corrugated plate-like inorganic fiber sheet and a flat plate-like inorganic fiber sheet, each supporting thereon a denitration catalyst containing a silica sol, titania particles, and ammonium metavanadate as a whole primary denitration catalyst layer, are alternately laminated.

It is preferable that ammonium metatungstate is further contained in the denitration catalyst of the whole primary denitration catalyst layer.

Specifically, an exhaust gas denitration apparatus is manufactured as follows. Here, a honeycomb structure in which a corrugated plate-like inorganic fiber sheet and a flat plate-like inorganic fiber sheet are alternately laminated is used as a base material. Then, first of all, a first method for manufacturing an exhaust gas denitration apparatus includes adding ammonium metavanadate to a slurry in which titania fine particles are suspended in a silica sol to adsorb it on titania, subsequently dipping the above-described honeycomb structure in this slurry, and drying and calcinating the resultant to support titania and vanadium simultaneously on the honeycomb structure.

Alternatively, a second method includes adding ammonium metavanadate to a slurry in which titania fine particles are suspended in a silica sol to adsorb it on titania, further adding ammonium metatungstate or an aqueous solution thereof, subsequently dipping the above-described honeycomb structure in this slurry, and drying and calcinating the resultant to support titania, tungsten, and vanadium simultaneously on the honeycomb structure.

The thus manufactured exhaust gas denitration apparatus is suitably used for denitration processing by means of catalytic reduction with ammonia of an exhaust gas emitting from, for example, a coal burning boiler containing solid particles such as high-concentration of dusts, coal ashes, etc, a gas turbine for power generation, a chemical plant of every kind, an incineration furnace, or the like. Examples of a reducing agent include liquid ammonia, ammonia water, urea water, and the like.

According to the above-described method for manufacturing an exhaust gas denitration apparatus, supporting of titania, supporting of tungsten, and supporting of vanadium can be conducted at the same time in one step, namely the operation of dipping, drying and calcination may be a one-time operation, and a decrease of the number of steps, an enhancement of productivity, and a reduction of cost can be achieved.

It is to be noted that in the present invention, the method for manufacturing an exhaust gas denitration apparatus is not limited to the above-described methods, and the exhaust gas denitration apparatus may also be one manufactured by any other method.

Here, examples of the inorganic fiber that is a raw material of the inorganic fiber sheet of the honeycomb structure include a ceramic fiber, a glass fiber, a silica fiber, an alumina fiber, and a rock wool.

The method for processing the edge(s) of a catalyst-supporting honeycomb structure in an exhaust gas denitration apparatus according to the present invention is characterized in that at least the edge of gas inlet side among the gas inlet side and the gas outlet side of the denitration catalyst-supporting honeycomb structure in the above-described exhaust gas denitration apparatus is(are) dipped in a denitration catalyst-containing slurry for edge processing composed of a silica sol, titania particles or kaolin particles, and ammonium metatungstate to form (a) coating layer(s) of the denitration catalyst-containing slurry in the edge(s) of the honeycomb structure, and this(these) is(are) dried and then calcinated to form (an) edge secondary denitration catalyst layer(s).

It is to be noted that the edge secondary denitration catalyst layer is formed in the edge of the gas inlet side in order to protect the denitration catalyst-supporting honeycomb structure from abrasion due to an exhaust gas from, for example, a coal burning boiler containing solid particles such as high-concentration of dusts, coal ashes, etc. On the other hand, the edge secondary denitration catalyst layer is also formed in the edge of the gas outlet side in order to protect the denitration catalyst-supporting honeycomb structure from abrasion between the denitration catalyst-supporting honeycomb structure and an outer frame of the apparatus or the like.

In the method for processing (an) edge(s) of a catalyst-supporting honeycomb structure in an exhaust gas denitration apparatus according to the present invention, it is preferable that a catalyst supporting amount of the whole primary denitration catalyst layer of the denitration catalyst-supporting honeycomb structure is from 100 to 300 g/m$^2$, a catalyst supporting amount of the edge secondary denitration catalyst layer is from 100 to 300 g/m$^2$, and a catalyst supporting amount in at least the edge of gas inlet side of the denitration catalyst-supporting honeycomb structure is(are) from 400 to 500 g/m$^2$ in total.

It is to be noted that a calculation formula of the catalyst supporting amount is as follows.

Catalyst supporting amount={(Weight of honeycomb structure after catalyst supporting)−(Weight of honeycomb structure)}/(Surface area of catalyst supporting portion of honeycomb structure)

The present inventors thought that abration by solid particles such as dust particles, coal ashes, etc. in an exhaust gas is mainly seen in an edge of a denitration catalyst-supporting honeycomb structure of an exhaust gas denitration apparatus, whereas in an inner portion through which a gas flow of the honeycomb structure, since the gas is rectified, and the dust particles move substantially parallel to the wall surface of the honeycomb structure, a remarkable wear or tear phenomenon is not seen, and therefore, it is more effective to increase the catalyst supporting amount in the edge of the honeycomb structure. Then, it has been found that by dipping the edge of the honeycomb structure which is easily abraded by the dust particles in a denitration catalyst-containing slurry for edge processing composed of a silica sol, titania particles or kaolin particles, and ammonium metatungstate to form a coating layer of the denitration catalyst-containing slurry in the edge, drying this, and then calcination to form an edge secondary denitration catalyst layer, fine cracks on a surface of the catalyst layer which will become a cause of abrasion of the edge of the catalyst-supporting honeycomb structure can be filled, and the abrasion resistant strength of the edge of the honeycomb structure can be sufficiently compensated.

In the method for processing (an) edge(s) of a catalyst-supporting honeycomb structure in an exhaust gas denitration apparatus according to the present invention, it is preferable that the denitration catalyst-containing slurry for edge processing has a catalyst component concentration of 50% by weight or more and not more than 60% by weight. According to this, at the time when the catalyst supporting amount of the whole primary denitration catalyst layer is 230 g/m$^2$, the catalyst supporting amount of the denitration catalyst-containing slurry for edge processing can be made to from 400 to 500 g/m$^2$ in total, and the abrasion resistant strength of the edge of the honeycomb structure can be sufficiently compensated. In this way, sufficient abrasion strength can be exhibited even under a considerably more severe acceleration condition than that in actual machines.

In addition, in the method for processing (an) edge(s) of a catalyst-supporting honeycomb structure in an exhaust gas denitration apparatus according to the present invention, by making the range of dipping the edge of the denitration catalyst-supporting honeycomb structure having the whole primary denitration catalyst layer in the denitration catalyst-containing slurry for edge processing to not more than 50 mm from the tip of the honeycomb structure, the denitration catalyst-supporting honeycomb structure can be sufficiently protected from abrasion due to an exhaust gas from, for example, a coal burning boiler containing solid particles such as high-concentration of dusts, coal ashes, etc.

It is to be noted that the range of dipping the edge of the denitration catalyst-supporting honeycomb structure having the whole primary denitration catalyst layer in the denitration catalyst-containing slurry for edge processing is made to preferably the range of 10 mm or more and not more than 50 mm, and more preferably the range of 30 mm or more and not more than 50 mm from the tip of the honeycomb structure.

EXAMPLES

Examples of the present invention are hereunder described, but it should not be construed that the present invention is limited thereto.

Example 1

An edge processing of a catalyst-supporting honeycomb structure in an exhaust gas denitration apparatus was conducted according to the method of the present invention in the following manner.

<Manufacture of Exhaust Gas Denitration Apparatus>

First of all, a corrugated ceramic fiber sheet and a flat plate-like ceramic fiber sheet were alternately laminated to form a honeycomb structure.

Subsequently, the resultant was dipped in a denitration catalyst-containing slurry composed of a silica sol, titanium particles, ammonium metavanadate, and ammonium metatungstate, thereby manufacturing an exhaust gas denitration apparatus equipped with a denitration catalyst-supporting honeycomb structure in which the corrugated plate-like ceramic fiber sheet and the flat plate-like ceramic fiber sheet, each supporting thereon a denitration catalyst (whole primary denitration catalyst) composed of a silica sol, titanium particles, ammonium metavanadate, and ammonium metatungstate in a supporting amount of 230.3 g/m$^3$, were alternately laminated.

<Edge Processing of Catalyst-Supporting Honeycomb Structure in Exhaust Gas Denitration Apparatus>

Subsequently, 40 g of titania particles were added to 130 g of a silica sol and well stirred, and thereafter, 44 g of ammonium metatungstate was added and again stirred, thereby preparing a denitration catalyst-containing slurry for edge processing. This slurry had a catalyst component concentration of 51.4% by weight.

An edge of the gas inlet side of the above-described denitration catalyst-supporting honeycomb structure was dipped in this denitration catalyst-containing slurry for edge processing for 15 seconds all through an inner portion of 50 mm in width from a tip thereof. Thereafter, the honeycomb structure was taken out from the denitration catalyst-containing slurry for edge processing, naturally dried for one hour, and then calcinated in an electric furnace at a temperature of 500° C. for one hour to form an edge secondary denitration catalyst layer, and edge processing of the gas inlet side of the denitration catalyst-supporting honeycomb structure was conducted. As a result, the edge secondary denitration catalyst layer of the edge of the gas inlet side of the denitration catalyst-supporting honeycomb structure had a catalyst supporting amount of 185.5 g/m$^2$. In consequence, the catalyst supporting amount in the edge of the gas inlet side of the denitration catalyst-supporting honeycomb structure was 415.8 g/m$^2$ in total of the whole primary denitration catalyst layer and the edge secondary denitration catalyst layer of the honeycomb structure.

Example 2

Though an edge processing of a catalyst-supporting honeycomb structure in an exhaust gas denitration apparatus is conducted in the same manner as that in the case of the above-described Example 1, a point which is different from that in the case of the above-described Example 1 resides in the fact that kaolin particles were used in place of the titania particles in the preparation of a denitration catalyst-containing slurry for edge processing.

It is to be noted that the catalyst component concentration of the denitration catalyst-containing slurry for edge processing using kaolin particles was 51.4% by weight. The catalyst supporting amount of the edge secondary denitration catalyst layer of the edge of the gas inlet side of the denitration catalyst-supporting honeycomb structure was 260.6 g/m$^2$. In consequence, the catalyst supporting amount in the edge of the gas inlet side of the denitration catalyst-supporting honeycomb structure was 490.9 g/m$^2$ in total of the whole primary denitration catalyst layer and the edge secondary denitration catalyst layer of the honeycomb structure.

The components of the denitration catalyst-containing slurry for edge processing and the catalyst component concentration of each of Examples 1 and 2 are shown in the following Table 1.

TABLE 1

| | Denitration catalyst-containing slurry component for edge processing (g) | | | | Catalyst component concentration (% by weight) |
|---|---|---|---|---|---|
| | Silica sol | Titania particles | Kaolin particles | AMT | |
| Example 1 | 130 | 40 | — | 44 | 51.4 |
| Example 2 | 130 | — | 40 | 44 | 51.4 |

Comparative Example 1

For comparison, edge processing of a catalyst-supporting honeycomb structure in an exhaust gas denitration apparatus was conducted by a conventional method described in Patent Literature 5. That is, the edge of the gas inlet side of the whole primary denitration catalyst-supporting honeycomb structure of the exhaust gas denitration apparatus manufactured in the first part of the above-described Example 1 was dipped in a 40% by weight ammonium metatungstate aqueous solution for 5 seconds all through an inner portion of 50 mm in a width from a tip thereof and then dried at 200° C. for one hour, and thereafter, the resultant was again dipped in a 40% by weight ammonium metatungstate aqueous solution for 5 seconds and dried at 400° C. for one hour to form an edge secondary denitration catalyst layer, and edge processing of the gas inlet side of the denitration catalyst-supporting honeycomb structure was conducted. As a result, the edge secondary denitration catalyst layer of the edge of the gas inlet side of the denitration catalyst-supporting honeycomb structure had a catalyst supporting amount of 115.9 g/m².

In view of the fact that the supporting amount of the whole primary denitration catalyst of the denitration catalyst-supporting honeycomb structure manufactured in the first part of the above-described Example 1, which was used in this Comparative Example 1, is 230.3 g/m², the catalyst supporting amount in the edge of the gas inlet side of the denitration catalyst-supporting honeycomb structure of Comparative Example 1 was 346.2 g/m² in total of the whole primary denitration catalyst layer and the edge secondary denitration catalyst layer of the honeycomb structure.

Here, it is to be noted that the reason why the dipping time in the ammonium metatungstate aqueous solution was set to 5 seconds resides in the fact that since the dipping liquid is not a slurry but an aqueous solution of ammonium metatungstate, in the case of being dipped for 5 seconds or more, the ammonium metatungstate also becomes supported at a position more than 50 mm from the tip due to a capillary phenomenon.

(Abrasion Resistant Strength Measuring Test)

With respect to the denitration catalyst-supporting honeycomb structures having been subjected to edge processing in the above-described Examples 1 and 2 and Comparative Example 1, an abrasion depth of the edge of the gas inlet side of each of the catalyst-supporting honeycomb structures was measured using an abrasion resistant strength measuring test system shown in FIG. 1.

A measuring test was carried out for 420 minutes under conditions of a coal burning dust amount of 1,050 g/h and a gas amount of 25 L/min (dust concentration: 700 g/m³, gas flow rate: 16.5 m/s) using the abrasion resistant strength measuring test system. The obtained results are shown in the following Table 2.

In Table 2, the catalyst supporting amount of the whole primary denitration catalyst layer of the honeycomb structure, the catalyst supporting amount of the edge secondary denitration catalyst layer of the gas inlet side, and the total catalyst supporting amount of the edge of the honeycomb structure are described along with the abrasion depth of the edge of the gas inlet side of each of the catalyst-supporting honeycomb structures.

It is to be noted that the test results by the illustrated abrasion resistant strength measuring test system are also evaluated according to the following formula that expresses a time corresponding to that in an actual machine (dust concentration: 6.3 g/m³, gas flow rate: 5.5 m/s). That is, it is understood that the present abrasion resistant strength measuring test is a result expressing the equal result to 20,000 equivalent hours in an actual machine.

Equivalent hours=(Test time)×{(Dust concentration of system)/(Dust concentration of actual machine)}×{(Gas flow rate of system)/(Gas flow rate of actual machine)}³

Incidentally, it is already understood that so long as the abrasion depth in the edge of the gas inlet side of the catalyst-supporting honeycomb structure is not more than 1.0 mm under the above-described condition, there is no problem even if it is applied to an actual machine.

TABLE 2

| | Catalyst supporting amount (g/m²) | | | |
|---|---|---|---|---|
| | Whole primary denitration catalyst layer | Edge secondary denitration catalyst layer | Total catalyst supporting amount of edge | Abrasion depth (mm) |
| Example 1 | 230.3 | 185.5 | 415.8 | 0.5 |
| Example 2 | 230.3 | 260.6 | 490.9 | 0.5 |
| Comparative Example 1 | 230.3 | 115.9 | 346.2 | 2.5 |

As is clear from the results of the above-described Table 2, in the denitration catalyst-supporting honeycomb structures having been subjected to edge processing in Examples 1 and 2 according to the present invention, the abrasion depth in the edge of the gas inlet side of the catalyst-supporting honeycomb structure by dust particles was 0.5 mm even in terms of 20,000 equivalent hours. In contrast, in Comparative Example 1 in which the edge processing with a 40% by weight ammonium metatungstate aqueous solution was conducted twice, abrasion of 2.5 mm in terms of 20,000 equivalent hours was seen. In consequence, it could be confirmed that, in accordance with the present method, not only the abrasion resistant strength of the edge of the honeycomb structure can be sufficiently compensated, but also the supporting amount of the catalyst component in the edge of the honeycomb structure can be increased, so that a denitration performance can be enhanced.

Referential Examples 1 to 3

For reference, the abrasion resistant strength measuring test was conducted in relation to the total of the whole primary denitration catalyst layer and the edge secondary denitration catalyst layer.

In Referential Examples 1 to 3, though edge processing of a catalyst-supporting honeycomb structure in an exhaust gas denitration apparatus is conducted in the same manner as that in the case of the above-described Example 1, a point which is different from that in the case of the above-described Example 1 resides in the fact that the catalyst supporting amount of the whole primary denitration catalyst layer was made to 234.6 g/m².

In addition, the catalyst component concentration of the denitration catalyst-containing slurry for edge processing was set to 51.4% by weight, the value of which is the same as that in the case of the above-described Example 1, in Referential Example 1, whereas it was set to 45.1% by weight in Referential Example 2 and 30.5% by weight in Referential Example 3, respectively. Then, the edge processing of the inlet side of the honeycomb structure was conducted using each of these denitration catalyst-containing slurries for edge processing in the same manner as that in the case of the above-described Example 1.

Here, in Referential Example 2, water was added to the denitration catalyst-containing slurry for edge processing of Example 1 and again stirred, thereby preparing the catalyst component concentration of the denitration catalyst-containing slurry for edge processing to 45.1% by weight. The processing of the edge of the gas inlet side of the denitration catalyst-supporting honeycomb structure was conducted by using this slurry. As a result, the catalyst supporting amount of the edge secondary denitration catalyst layer was 127.5 g/m². In consequence, the catalyst supporting amount in the edge of the gas inlet side of the denitration catalyst-supporting honeycomb structure was 362.1 g/m² in total of the whole primary denitration catalyst layer and the edge secondary denitration catalyst layer of the honeycomb structure.

Also, in Referential Example 3, water was added to the denitration catalyst-containing slurry for edge processing of Example 1 and again stirred, thereby preparing the catalyst component concentration of the denitration catalyst-containing slurry for edge processing to 30.5% by weight. The processing of the edge of the gas inlet side of the denitration catalyst-supporting honeycomb structure was conducted using this slurry. As a result, the catalyst supporting amount of the edge secondary denitration catalyst layer was 49.1 g/m². In consequence, the catalyst supporting amount in the edge of the gas inlet side of the denitration catalyst-supporting honeycomb structure was 283.7 g/m² in total of the whole primary denitration catalyst layer and the edge secondary denitration catalyst layer of the honeycomb structure.

The catalyst component of the denitration catalyst-containing slurry for edge processing and the catalyst supporting amount of the edge secondary denitration catalyst layer of the edge of the gas inlet side of the denitration catalyst-supporting honeycomb structure after edge processing with such a slurry in each of Referential Examples 1 to 3 are shown in the following Table 3.

FIG. 2 is a graph showing a relation of the catalyst component concentration of the denitration catalyst-containing slurry for edge processing with the catalyst supporting amount of the edge secondary denitration catalyst layer of the edge of the gas inlet side of the denitration catalyst-supporting honeycomb structure after edge processing. It is understood from this FIG. 2 that the increase of the catalyst component concentration of the denitration catalyst-containing slurry for edge processing results in the increase of the catalyst supporting amount of the edge secondary denitration catalyst layer of the denitration catalyst-supporting honeycomb structure after edge processing.

TABLE 3

| | Catalyst component concentration of catalyst-containing slurry for edge processing (% by weight) | Catalyst supporting amount of edge secondary denitration catalyst layer (g/m²) |
|---|---|---|
| Referential Example 1 | 51.4 | 185.5 |
| Referential Example 2 | 45.1 | 127.5 |
| Referential Example 3 | 30.5 | 49.1 |

Next, with respect to the denitration catalyst-supporting honeycomb structures having been subjected to edge processing in Referential Examples 1 to 3, an abrasion depth of the edge of the gas inlet side of each of the denitration catalyst-supporting honeycomb structures was measured using the abrasion resistant strength measuring test system shown in FIG. 1 in the same manner as that in the above-described cases.

The test was carried out for 60 minutes under a considerably more severe dust acceleration condition than that in an actual machine of exhaust gas denitration apparatus, namely under a condition of a coal burning dust amount of 1,050 g/h and a gas amount of 60.5 L/min (dust concentration: 291.7 g/m³, gas flow rate: 40.0 m/s) using an abrasion resistant strength measuring test system. The obtained results are shown in the following Table 4 and FIG. 3.

In Table 4, the catalyst supporting amount of the whole primary denitration catalyst layer, the catalyst supporting amount of the edge secondary denitration catalyst layer of the gas inlet side of the honeycomb structure, and the total catalyst supporting amount of the edge of the honeycomb structure are described along with the abrasion depth of the edge of the gas inlet side of each of the catalyst-supporting honeycomb structures.

FIG. 3 is a graph showing a relation of the total catalyst supporting amount of the edge of the gas inlet side of the denitration catalyst-supporting honeycomb structure in Referential Examples 1 to 3 with an abrasion depth of the subject edge after abrasion resistant strength measuring test.

It is to be noted that the above-described test condition is a considerably more severe dust acceleration condition than that in an actual machine of exhaust gas denitration apparatus and is suitable for making a simple estimate of the abrasion resistant strength of the edge of the catalyst-supporting honeycomb structure. It is already understood from experiences of trial manufacture that so long as the abrasion depth in the edge of the gas inlet side of the catalyst-supporting honeycomb structure is not more than 8.0 mm under the above-described test condition, there is no problem even if it is applied to an actual machine of exhaust denitration apparatus.

TABLE 4

| | Catalyst supporting amount (g/m²) | | | |
|---|---|---|---|---|
| | Whole primary denitration catalyst layer | Edge secondary denitration catalyst layer | Total catalyst supporting amount of edge | Abrasion depth (mm) |
| Referential Example 1 | 234.6 | 185.5 | 420.1 | 7.5 |

TABLE 4-continued

| | Catalyst supporting amount (g/m$^2$) | | | |
|---|---|---|---|---|
| | Whole primary denitration catalyst layer | Edge secondary denitration catalyst layer | Total catalyst supporting amount of edge | Abrasion depth (mm) |
| Referential Example 2 | 234.6 | 127.5 | 362.1 | 15.0 |
| Referential Example 3 | 234.6 | 49.1 | 283.7 | 19.0 |

As is clear from the results of Table 4 and FIG. 3, in Referential Example 1 according to the present invention, in the denitration catalyst-supporting honeycomb structure which was subjected to edge processing with the denitration catalyst-containing slurry for edge processing having a catalyst component concentration of 51.4% by weight, the abrasion depth in the edge of the gas inlet side was 7.5 mm, the value of which was a level at which there is no problem even if it is applied to an actual machine of exhaust denitration apparatus. In contrast, in Referential Example 2, in the denitration catalyst-supporting honeycomb structure which was subjected to edge processing with the denitration catalyst-containing slurry for edge processing having a catalyst component concentration of 45.1% by weight, the abrasion depth in the edge of the gas inlet side was 15.0 mm; and in Referential Example 3, in the denitration catalyst-supporting honeycomb structure which was subjected to edge processing with the denitration catalyst-containing slurry for edge processing having a catalyst component concentration of 30.5% by weight, the abrasion depth in the edge of the gas inlet side was 19.0 mm.

From this fact, it could be confirmed that in the denitration catalyst-containing slurry for edge processing, the catalyst component concentration is preferably 50% by weight or more, whereby the catalyst supporting amount in at least the edge of gas inlet side of the denitration catalyst-supporting honeycomb structure can be made to from 400 to 500 g/m$^2$ in total, and the abrasion resistant strength of the edge of the honeycomb structure can be sufficiently compensated.

It is to be noted that when the catalyst component concentration of the denitration catalyst-containing slurry for edge processing is more than 60% by weight, the catalyst component in the slurry becomes high in concentration to increase its viscosity, so that on the occasion of dipping the edge of the denitration catalyst-supporting honeycomb structure therein, clogging is caused, and hence, such is not preferable.

The invention claimed is:

1. A method for processing an edge of a catalyst-supporting honeycomb structure in an exhaust gas denitration apparatus, comprising:
   dipping a denitration catalyst-supporting honeycomb structure, formed by alternately laminating a corrugated plate-like inorganic fiber sheet and a flat plate-like inorganic fiber sheet, in a slurry containing a silica sol, titania particles, and ammonium metavanadate to form a whole primary denitration catalyst layer;
   dipping the edge of a gas inlet side of the denitration catalyst-supporting honeycomb structure having the whole primary denitration catalyst layer in a denitration catalyst-containing slurry for edge processing comprising a silica sol, titania particles or kaolin particles, and ammonium metatungstate to form a coating layer on the edge of the denitration catalyst-supporting honeycomb structure; and
   drying and calcinating the edge of the denitration catalyst-supporting honeycomb structure to form an edge secondary denitration catalyst layer,
   wherein a catalyst supporting amount of the whole primary denitration catalyst layer of the denitration catalyst-supporting honeycomb structure is from 100 to 300 g/m$^2$, a catalyst supporting amount of the edge secondary denitration catalyst layer is from 100 to 300 g/m$^2$, and a catalyst supporting amount in the edge of gas inlet side of the denitration catalyst-supporting honeycomb structure is from 400 to 500 g/m$^2$ in total.

2. The method for processing an edge of a catalyst-supporting honeycomb structure in an exhaust gas denitration apparatus according to claim 1, wherein ammonium metatungstate is further contained in the denitration catalyst of the whole primary denitration catalyst layer.

3. The method for processing an edge of a catalyst-supporting honeycomb structure in an exhaust gas denitration apparatus according to claim 1, wherein the denitration catalyst-containing slurry for edge processing has a catalyst component concentration of 50% by weight or more and not more than 60% by weight.

4. The method for processing an edge of a catalyst-supporting honeycomb structure in an exhaust gas denitration apparatus according to claim 1, wherein a range of dipping the edge of the denitration catalyst-supporting honeycomb structure having the whole primary denitration catalyst layer in the denitration catalyst-containing slurry for edge processing is not more than 50 mm from a tip of the honeycomb structure.

5. The method for processing an edge of a catalyst-supporting honeycomb structure in an exhaust gas denitration apparatus according to claim 1, wherein the edge secondary denitration catalyst layer is also formed in the edge of the gas outlet side.

* * * * *